(12) United States Patent
Tapio et al.

(10) Patent No.: US 9,079,383 B2
(45) Date of Patent: Jul. 14, 2015

(54) METHOD OF APPLYING OPTICAL FILM TO LARGE FORMAT DISPLAY PANEL (75) Inventors: Scott M. Tapio, Falcon Heights, MN (US); Robert J. Reuter, Woodbury, MN (US); Audrey A. Sherman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 63 days.

(21) Appl. No.: 13/989,470

(22) PCT Filed: Nov. 21, 2011

(86) PCT No.: PCT/US2011/061572
§ 371 (c)(1),
(2), (4) Date: May 24, 2013

(87) PCT Pub. No.: WO2012/074802
PCT Pub. Date: Jun. 7, 2012

(65) Prior Publication Data
US 2013/0255874 A1  Oct. 3, 2013

Related U.S. Application Data (60) Provisional application No. 61/417,582, filed on Nov. 29, 2010.

(51) Int. Cl.
B29C 65/48 (2006.01)
B32B 37/12 (2006.01)
(Continued)

(52) U.S. Cl.
CPC ............... B32B 38/10 (2013.01); B29C 63/02 (2013.01); C09J 5/00 (2013.01); C09J 7/02 (2013.01);
(Continued)

(58) Field of Classification Search
CPC .... B32B 37/12; B32B 38/10; H01L 21/6835; C09J 5/00; C09J 7/02; C09J 175/02; C09J 175/04; C09J 2203/318; C08G 18/10; C08G 2170/40; B29C 63/0047; B29C 63/02; B29C 2063/027; B29L 2031/3475; G02B 27/0006
USPC .............. 156/249, 325, 331.7, 701, 719
See application file for complete search history.

(56) References Cited

U.S. PATENT DOCUMENTS 4,197,151 A * 4/1980 Muzik ........................... 156/249
5,498,455 A * 3/1996 Roberts ........................ 428/41.8
(Continued)

FOREIGN PATENT DOCUMENTS

EP 539099 4/1993
WO WO 2005-044470 5/2005
(Continued)

OTHER PUBLICATIONS

"Anleitung: Dipos Displayschutzfolie blasenfrei montieren", E-cultor Apr. 23, 2010, XP002669043, [Retrieved from the Internet on Feb. 8, 2012], URL<:http://web.archi ve.org/web/20100423160 944/ http://www.dipos.de/anleitung-displays chutzfol i e-anbri ngen. html?>.
(Continued)

*Primary Examiner* — Sing P Chan
(74) *Attorney, Agent, or Firm* — Jeffrey M. Olofson (57) ABSTRACT A method of applying optical film to a large format display panel is described. The method utilizes optical film (20) that has been pre-cut to cover a given area of the panel, such that the film does not need to be cut or trimmed after it is adhered to the panel. The method is suitable for use with large format display panels such as those having viewable areas of 208 cm (82 inches) diagonal.

10 Claims, 7 Drawing Sheets (51) Int. Cl.
- *B32B 37/26* (2006.01)
- *B32B 38/18* (2006.01)
- *B32B 43/00* (2006.01)
- *C09J 4/00* (2006.01)
- *C09J 175/02* (2006.01)
- *B32B 38/10* (2006.01)
- *B29C 63/02* (2006.01)
- *C09J 5/00* (2006.01)
- *C09J 7/02* (2006.01)
- *B29C 63/00* (2006.01)
- *B29L 31/34* (2006.01)
- *G02B 27/00* (2006.01)

(52) U.S. Cl.
CPC ....... *B29C 63/0047* (2013.01); *B29C 2063/027* (2013.01); *B29L 2031/3475* (2013.01); *C09J 2203/318* (2013.01); *G02B 27/0006* (2013.01)

(56) References Cited

U.S. PATENT DOCUMENTS

| | | | |
|---|---|---|---|
| 6,497,777 B1 | 12/2002 | Huang | |
| 7,808,575 B2 * | 10/2010 | Watanabe et al. | 349/64 |
| 7,862,898 B2 | 1/2011 | Sherman | |
| 7,892,649 B2 | 2/2011 | Sherman | |
| 8,154,691 B2 * | 4/2012 | Searle | 349/112 |
| 8,369,072 B1 * | 2/2013 | Alonzo et al. | 361/679.01 |
| 2004/0246386 A1 * | 12/2004 | Thomas et al. | 348/818 |
| 2007/0054133 A1 | 3/2007 | Sherman | |
| 2007/0055019 A1 | 3/2007 | Sherman | |
| 2007/0082969 A1 | 4/2007 | Malik | |
| 2007/0212535 A1 | 9/2007 | Sherman | |
| 2009/0186181 A1 | 7/2009 | Mase | |

FOREIGN PATENT DOCUMENTS

| | | |
|---|---|---|
| WO | WO 2009-085662 | 7/2009 |
| WO | WO 2010-132176 | 11/2010 |
| WO | WO 2012-005875 | 1/2012 |
| WO | WO 2012-005878 | 1/2012 |
| WO | WO 2012-061296 | 5/2012 |

OTHER PUBLICATIONS

Satas, Handbook of Pressure Sensitive Adhesive Technology, Second Edition, (1989).

International Search Report for PCT International Application No. PCT/US2011/061572, mailed on May 21, 2012, 10 pages.

* cited by examiner

METHOD OF APPLYING OPTICAL FILM TO LARGE FORMAT DISPLAY PANEL

FIELD

This disclosure relates to a method of applying optical film to large format display panels.

BACKGROUND

Electronic devices such as handheld devices, computer monitors and televisions include fragile, pristine display panels that are susceptible to damage from the moment the devices are unpacked. Protection films of optical quality are available and can be applied to the exposed surface of a display panel by a consumer after the device is purchased, or during manufacture of the device. Generally, the smaller the area of the display panel to be covered with a protection film, the easier it is to apply the film to the panel with little or no optical defects. Large format electronic devices such as televisions, signage and informational displays have been developed with display panels having large viewing areas, for example, touch screens used to communicate changing travel timetables in busy railway stations have been developed and can be as large as 208 cm (82 inches) or greater.

SUMMARY

Disclosed herein is a method of applying an optical film to a large format display panel, comprising: (a) providing a large format display panel having a diagonal of at least about 432 mm (17 inches); (b) providing a pre-cut laminate comprising an optical film comprising an adhesive layer disposed on an optical substrate, and a release liner disposed on the adhesive layer opposite the optical substrate; (c) separating the release liner from the adhesive layer to expose a portion of the adhesive layer, the exposed portion comprising less than 25% of the total area of the adhesive layer; (d) contacting the exposed portion of the adhesive layer with the display panel; (e) further separating the release liner from the adhesive layer to expose a remaining portion of the adhesive layer; and (f) contacting the remaining portion of the adhesive layer with the display panel such that the optical film covers at least 95% of the display panel; wherein the method is carried out without liquid. The method can be carried out without trimming or cutting the pre-cut laminate.

Also disclosed herein is a method of applying an optical film to a large format display panel, comprising: (a) providing a large format display panel having a diagonal of at least about 17 inches; (b) providing a pre-cut laminate comprising an optical film comprising an adhesive layer disposed on an optical substrate, and a split release liner comprising first and second portions disposed on the adhesive layer opposite the optical substrate, the second portion comprising regions of pressure sensitive adhesive opposite the adhesive layer; (c) adhering the pre-cut laminate to the display panel by contacting the panel with the regions of pressure sensitive adhesive; (d) separating the first portion of the split release liner from the adhesive layer to expose a portion of the adhesive layer, the exposed portion comprising less than 25% of the total area of the adhesive layer; (e) contacting the exposed portion of the adhesive layer with the display panel; (f) separating the regions of pressure sensitive adhesive from the display panel; (g) separating the second portion of the release liner from the adhesive layer to expose a remaining portion of the adhesive layer; and (h) contacting the remaining portion of the adhesive layer with the display panel such that the optical film covers at least 95% of the display panel; wherein the method is carried out without liquid. The method can be carried out without trimming or cutting the pre-cut laminate.

These and other aspects of the invention are described in the detailed description below. In no event should the above summary be construed as a limitation on the claimed subject matter which is defined solely by the claims as set forth herein.

BRIEF DESCRIPTION OF DRAWINGS

Advantages and features of the invention may be more completely understood by consideration of the following figures in connection with the detailed description provided below. The figures are schematic drawings and illustrations and are not necessarily drawn to scale.

DETAILED DESCRIPTION

It is generally desirable for an optical film such as a protection film to cover some area of a display panel (and perhaps beyond the display panel as described below) such that the edges of the film are flush or nearly flush with the edges of the panel. Sizing of the optical film can be achieved by either cutting the film before or after it has been adhered to the panel. Regardless of how an optical film is applied, it is generally undesirable to trim or cut the film after it has been adhered to a display panel because a sharp implement is typically needed to cut through the film, and this can be difficult to accomplish without damaging the underlying panel.

It is known to apply optical films to display panels using aqueous or nonaqueous liquids. For example, aqueous solutions comprising small amounts of surfactants are available for this purpose. The solution is spread out on the surface of the display panel and/or the underside of the optical film. When the film contacts the display panel, solution is intentionally trapped between the two which allows the film to be slid around on the panel until it is acceptably positioned. Solution and any trapped air is then removed by smoothing the film down onto the panel either by hand or with a tool. This type of application can be messy and frustrating, and water can damage the display panel or other nearby objects.

An optical film having an adhesive layer on one side can be applied to a display panel by simply contacting the two followed by smoothing the film down onto the panel either by hand or with a tool. This method can be difficult to perform, for example, because air can be easily trapped between the film and the panel, and it can be difficult to align the film and the panel. Some optical films can be removed and applied several times until an acceptable result is obtained. This method may be suitable for use with films that are easily handleable by virtue of their size, such as for covering small display panels of handheld devices, netbooks, laptops and some computer monitors.

The method of using an optical film with an adhesive layer, however, is not suitable for use with optical films needed to cover large format display panels. An optical film used with a large format display panel has a large area which makes the film difficult to handle without creasing or wrinkling, especially when trying to minimize entrapment of air and accumulation of unwanted debris on the adhesive layer. Also, because these large optical films can be difficult to handle, it is nearly impossible to obtain acceptable alignment of the film and the panel if the film is pre-cut to the final size.

The method disclosed herein is advantageous because it can be used to apply, with relative ease and success, large optical films to large format display panels. The method utilizes pre-cut optical film that has been sized to cover a particular area of a display panel. The method can be carried out without any type of liquid. In some embodiments, the method can be carried out without cutting the laminate or optical film once contact is made with the display panel. The method disclosed herein utilizes "dry-apply" adhesive in the form of an adhesive layer on an optical substrate. The dry-apply adhesive layer can be self-wetting and/or removable such that it can be completely or partially repositioned as desired.

The method disclosed herein can also be used to facilitate handling of large optical films with little exposure and contamination of the adhesive layer at any time during application. Further, the method disclosed herein can be used to minimize problems associated with air trapped between the adhesive layer and the display panel because air bubbles can dissipate on their own.

The method disclosed herein is useful with any type of electronic display device such as devices having a liquid crystal display (LCD) panel or plasma display panel. A major surface of the panel (typically glass) forms an outermost surface of the device and makes up a viewable area of the panel. As used herein, the term "display panel" refers to this outermost surface of the panel and can also include any continuous, smooth surface that is co-parallel or in the same plane with the outermost surface. For example, the display panel may include only the viewable area, or the display panel may include the viewable area in addition to non-viewable area around the perimeter of the viewable area, which is often covered by a frame.

The method disclosed herein is useful with electronic display devices having large format display panels. The term "large format" refers to an area of the display panel to which the optical film is applied, wherein the area has a diagonal measurement of at least 432 mm (17 inches) with some common aspect ratio, for example, 16:9 aspect ratio. Large format display panels can have viewable areas with diagonal measurements such as 432, 508, 610, 838, 914, 1016, 1067, 1168, 1219, 1270, 1397, 1524, 1575, or 2083 mm (17, 20, 24, 33, 36, 40, 42, 46, 48, 50, 55, 60, 62, or 82 inches), with a 16:9 aspect ratio.

Figure 1:
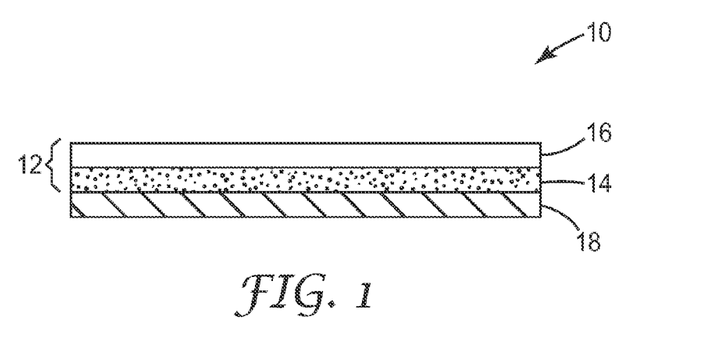
FIG. 1 shows a schematic cross section of an exemplary laminate.

The method disclosed herein requires a pre-cut laminate. FIG. 1 shows a schematic cross section of laminate 10 which may or may not be in a pre-cut form. Laminate 10 comprises optical film 12 that includes optical substrate 16 and adhesive layer 14 disposed on the substrate. Laminate 10 includes release liner 18 disposed on adhesive layer 14 opposite optical substrate 16.

The laminate is pre-cut in the sense that it is appropriately sized before completion of application to the display panel. Preferably, the laminate is pre-cut such that after application of the optical film to the display panel is complete, the optical film covers from about 95-98% of the panel. In some embodiments, it may be acceptable for the optical film to cover at least about 90%, 92%, 95%, 98% or at least about 100% of the display panel. In some embodiments, it may be acceptable for the optical film to cover at from about 90% to at least about 100%, from about 92% to at least about 100%, or from about 95% to about 98% of the display panel.

Figure 2:
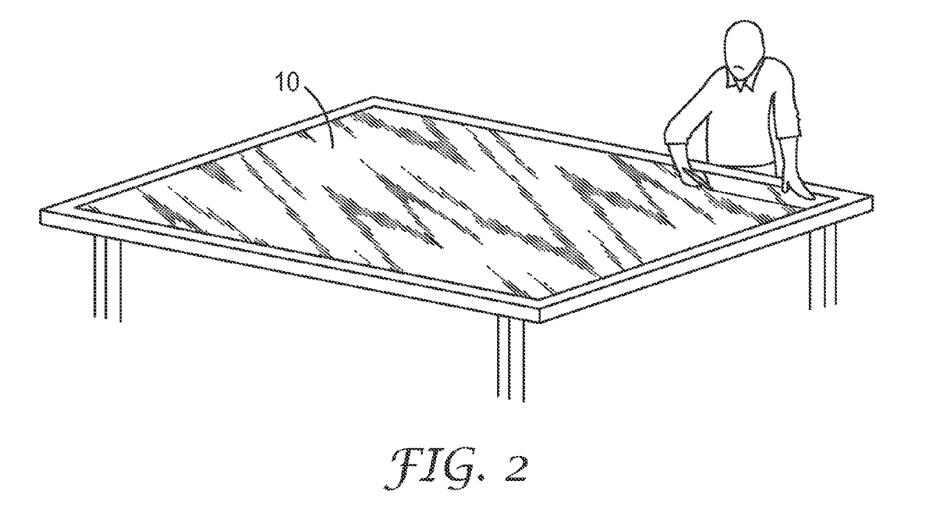
FIG. 2 shows an optional step of the method disclosed herein.

FIG. 2 shows an optional step of the method disclosed herein, which can be carried out to form a pre-cut laminate before beginning the method. Laminate 10 is laid on a flat surface, with either optical substrate 16 or release liner 18 facing up, and cut to size using a cutting implement to form a pre-cut laminate.

Figure 3A:
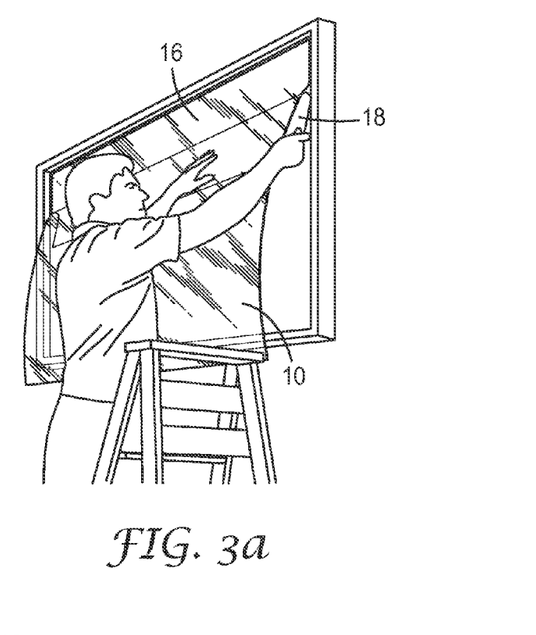
FIGS. 3a-3c show an embodiment of the method in which an optical film is applied to a large format display panel of an electronic device mounted to a wall.
Figure 3B:
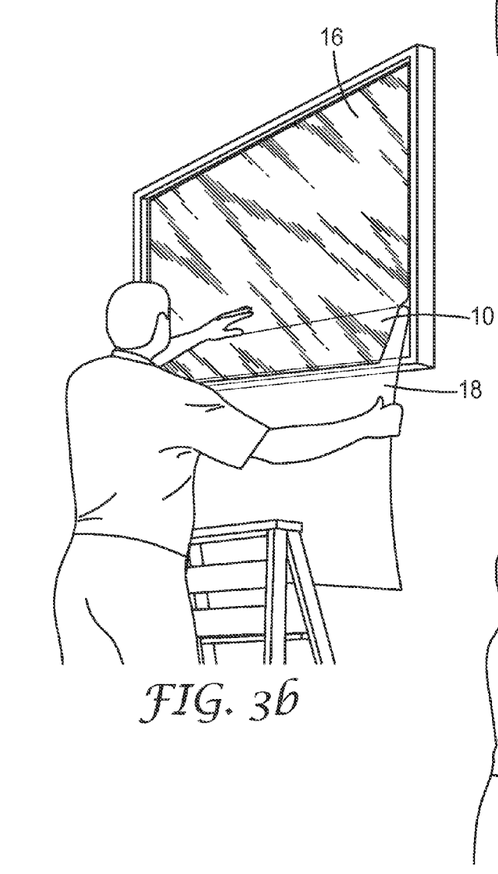
Figure 3C:
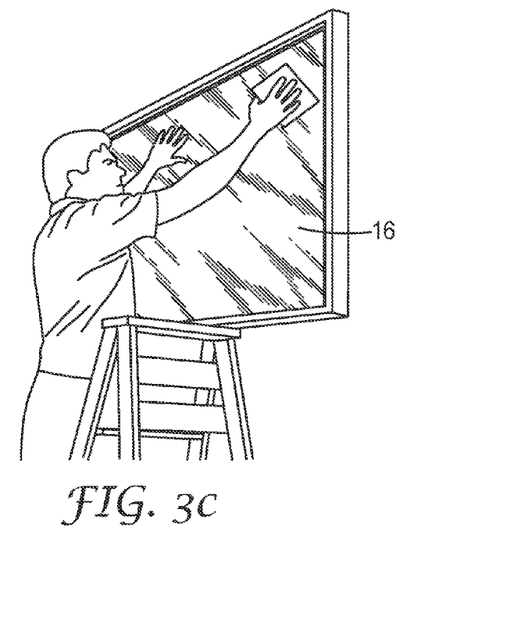

FIGS. 3a-3c show an embodiment of the method in which an optical film is applied to a large format display panel of an electronic device mounted to a wall. As shown in FIG. 3a, a small area of release liner 18 is separated from adhesive layer 14 (not visible in FIGS. 3a-3c) to expose a portion of the adhesive layer, for example, less than 25% of the total area of the adhesive layer. The amount of area of exposed adhesive layer can depend upon the size of the display panel, and/or the nature of the adhesive layer, for example, the tackiness of the layer. In some embodiments, it may be desirable to expose less than 10% of the total area of the adhesive layer. The exposed portion of the adhesive layer is contacted with a portion, typically the upper portion, of the display panel which in this case is the viewable area of the panel.

The step shown in FIG. 3a needs to be carried out such that acceptable alignment of the portion of the optical film with exposed adhesive layer, is obtained. In some embodiments, it may be acceptable to have a gap of less than about 3 mm between the edges of the portion of the optical film with exposed adhesive layer and the edges of the display panel to be covered. Preferably, the gap is as small as possible, and may be less than 5 mm or less than 1 mm.

The next step is shown in FIG. 3b, wherein release liner 18 is further separated from the adhesive layer to expose a remaining portion of the adhesive layer, and the remaining portion of the adhesive layer is contacted with the display panel such that the optical film covers at least about 95% of the display panel. In some embodiments, it may be acceptable for the optical film to cover at least about 90%, 92%, 95%, 98% or at least about 100% of the display panel. In some embodiments, it may be acceptable for the optical film to cover at from about 90% to at least about 100%, from about 92% to at least about 100%, or from about 95% to about 98% of the display panel.

An optional step is shown in FIG. 3c, wherein optical film 12 (shown as optical substrate 16 for clarity) is smoothed down with a tool having a smooth enough edge so as not to damage the film. This step may be carried out, for example, if bubbles are trapped and are at least about 3 mm (⅛ inch). Bubbles may be allowed to dissipate on their own without the need for this optional step, typically if the bubbles are less than 3 mm (⅛ inch).

Figure 4A:
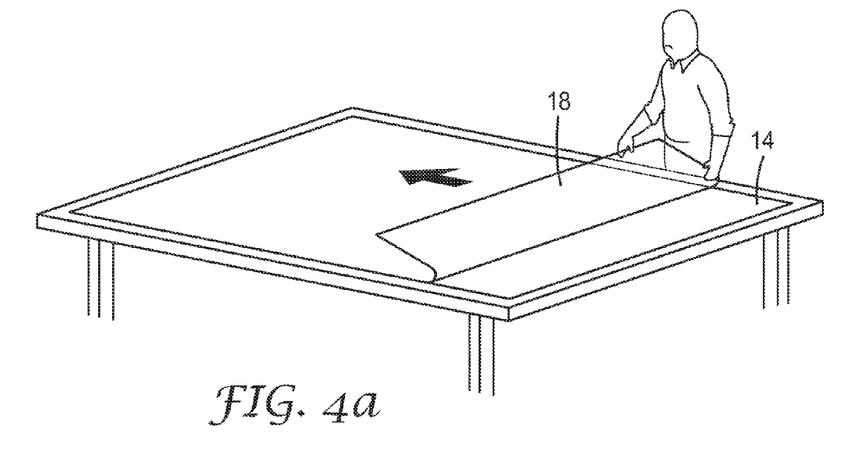
FIGS. 4a-4d show an embodiment of the method in which an optical film is applied to a large format display panel of an electronic device not in a vertical position.

FIGS. 4a-4d show an embodiment of the method in which an optical film is applied to a large format display panel of an electronic device not in a vertical position. As shown in FIG. 4a, a small area of release liner 18 is separated from adhesive layer 14 to expose a portion of adhesive layer 14, for example, less than 25% or less than 10% of the total area of the adhesive layer as described above.

Figure 4B:
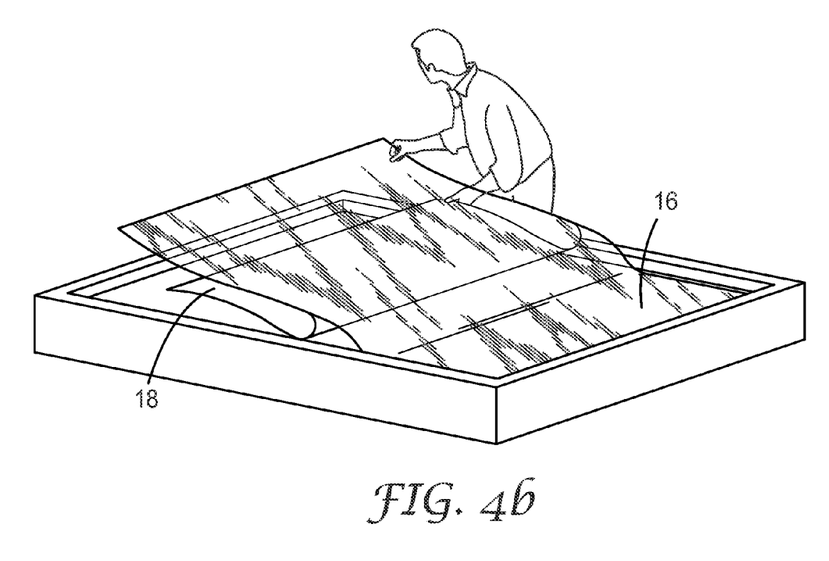

As shown in FIG. 4b, the exposed portion of the adhesive layer is contacted with a portion of the display panel which in this case is the viewable area of the panel. The step shown in FIG. 4b needs to be carried out such that acceptable alignment of the portion of the optical film with exposed adhesive layer, is obtained, as described above for FIG. 3b. In some embodiments, it may be acceptable to have a gap of less than about 3 mm between the edges of the portion of the optical film with exposed adhesive layer and the edges of the display panel to be covered. Preferably, the gap is as small as possible, and may be less than 5 mm or less than 1 mm.

Figure 4C:
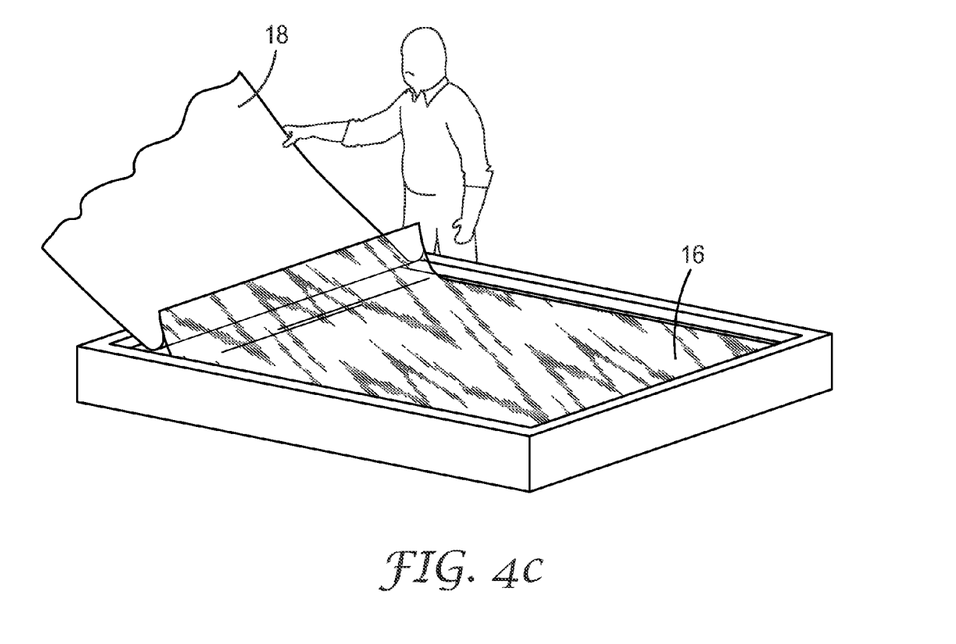

The next step is shown in FIG. 4c, wherein release liner 18 is further separated from the adhesive layer to expose a remaining portion of the adhesive layer, and the remaining portion of the adhesive layer is contacted with the display panel such that the optical film covers at least about 95% of the display panel. In some embodiments, it may be acceptable for the optical film to cover at least about 90%, 92%, 95%, 98% or at least about 100% of the display panel. In some embodiments, it may be acceptable for the optical film to cover at from about 90% to at least about 100%, from about 92% to at least about 100%, or from about 95% to about 98% of the display panel.

Figure 4D:
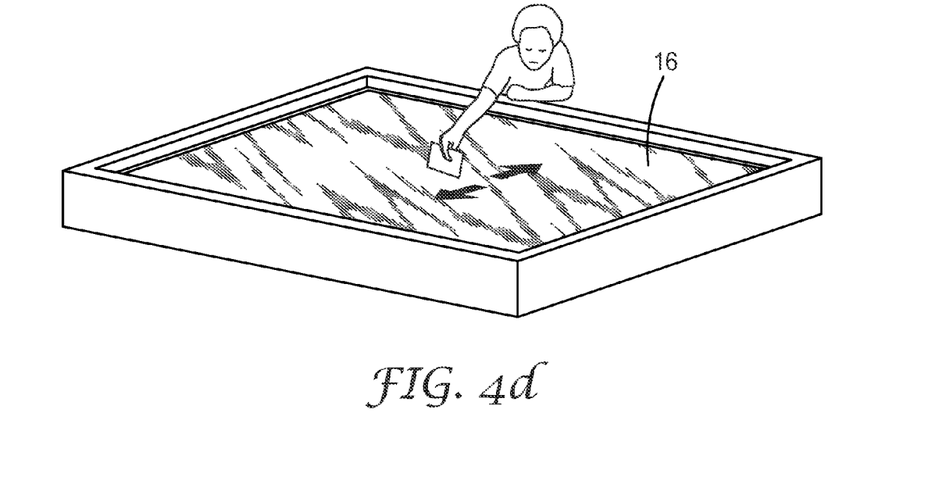

An optional step is shown in FIG. 4d, wherein optical film 12 (shown as optical substrate 16 for clarity) is smoothed down with a tool having a smooth enough edge so as not to damage the film. This step may be carried out, for example, if bubbles are trapped and are at least about 3 mm (⅛ inch). Bubbles may be allowed to dissipate on their own without the need for this optional step, typically if the bubbles are less than 3 mm (⅛ inch).

Figure 5:
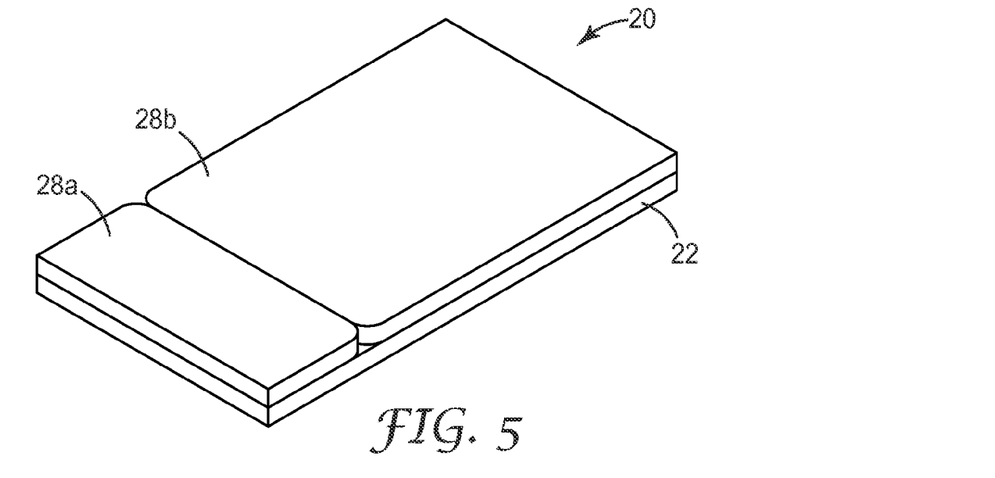
FIGS. 5-6 show schematic perspective views of exemplary laminates.

FIG. 5 shows a schematic perspective view of an exemplary laminate which may or may not be in a pre-cut form. Laminate 20 comprises optical film 22 that includes an optical substrate and adhesive layer disposed on the substrate. Laminate 20 includes split release liner comprising first portion 28a and second portion 28b, the liner being disposed on the adhesive layer. A split release liner may be used to facilitate exposure of the adhesive layer that forms the exposed portion of the adhesive layer described in any of the above embodiments.

Figure 6:
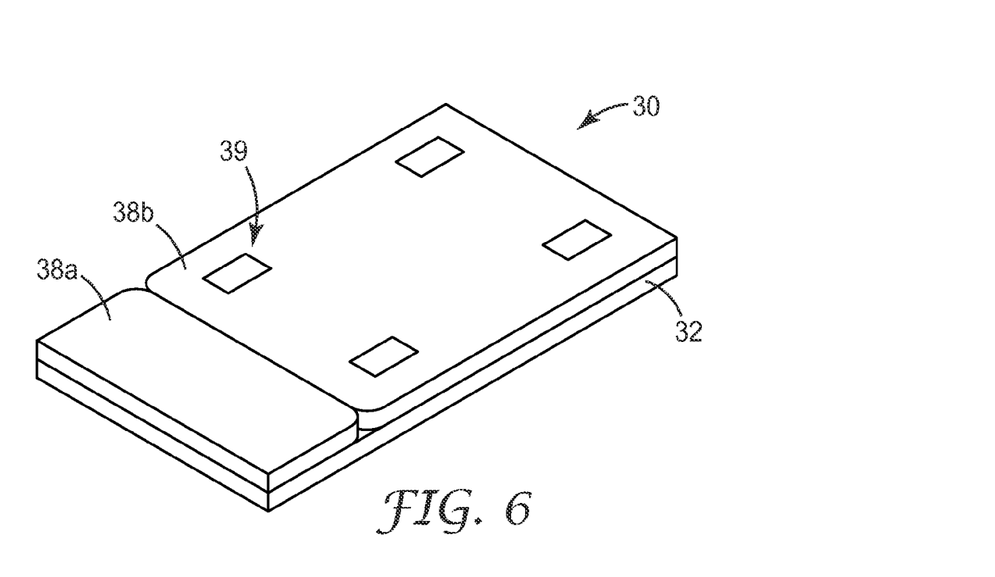

FIG. 6 shows a schematic perspective view of an exemplary laminate which may or may not be in a pre-cut form. Laminate 30 comprises optical film 32 that includes an optical substrate and adhesive layer disposed on the substrate. Laminate 30 includes split release liner comprising first portion 38a and second portion 38b, the liner being disposed on the adhesive layer. Disposed on second portion 38b are regions 39 of pressure sensitive adhesive (PSA) wherein the regions are opposite the adhesive layer of optical film 32. Not shown in FIG. 6 is one or more release liners used to protect the regions of PSA until use.

Figure 7A:
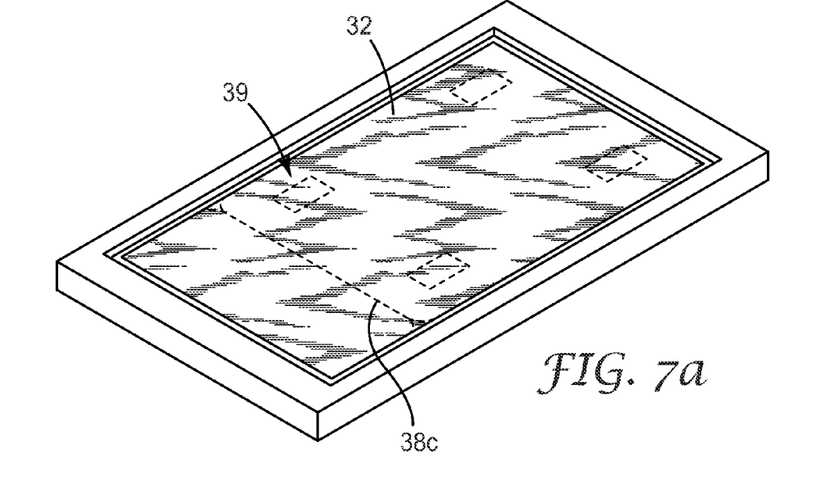
FIGS. 7a-7d show an embodiment of the method in which an optical film is applied to a large format display panel of an electronic device not in a vertical position.

FIGS. 7a-7d show an embodiment of the method in which an optical film is applied to a large format display panel of an electronic device not in a vertical position. This embodiment employs exemplary laminate 30. As shown in FIG. 7a, laminate 30 is placed on the display panel with regions of PSA 39 in contact with the panel, the regions indicated with dotted lines to show that they are underneath optical film 32 as shown in the perspective view. The first and second portions 38a and 38b, respectively, are indicated with dotted line 38c to show where the portions meet. Second portion 30b (see FIG. 7b) of laminate 30 comprises that portion of the laminate which includes all or most of second portion 38b of release liner 38. Regions of PSA 39 adhere second portion 30b to the display panel such that the second portion does not move easily during the step shown in FIG. 7b.

Figure 7B:
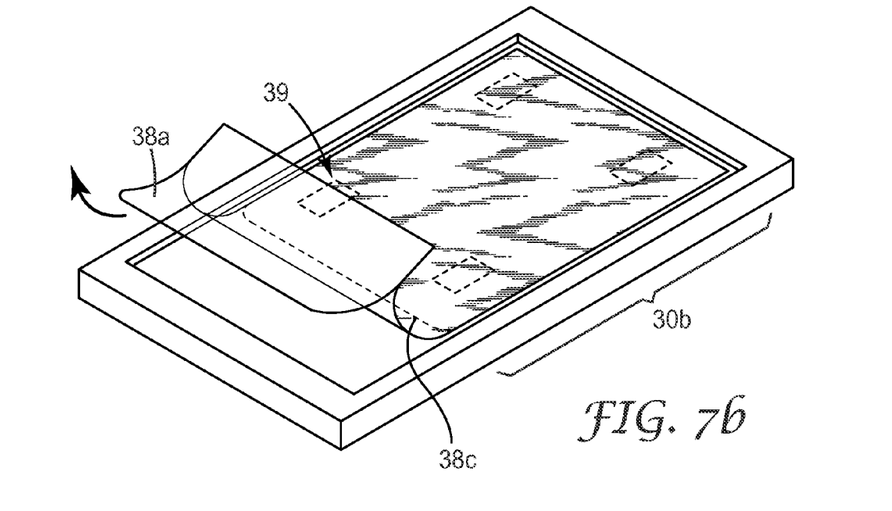

As shown in FIG. 7b, first portion 38a of release liner 38 is separated from the adhesive layer to expose a portion of adhesive layer, for example, less than 25% or less than 10% of the total area of the adhesive layer as described above. After first portion 38a is removed, the exposed portion of the adhesive layer is contacted with a portion of the display panel which in this case is the viewable area of the panel. The step shown in FIG. 7b needs to be carried out such that acceptable alignment of the portion of the optical film with exposed adhesive layer, is obtained, as described above for FIG. 3b. In some embodiments, it may be acceptable to have a gap of less than about 3 mm between the edges of the portion of the optical film with exposed adhesive layer and the edges of the display panel to be covered. Preferably, the gap is as small as possible, and may be less than 5 mm or less than 1 mm.

Figure 7C:
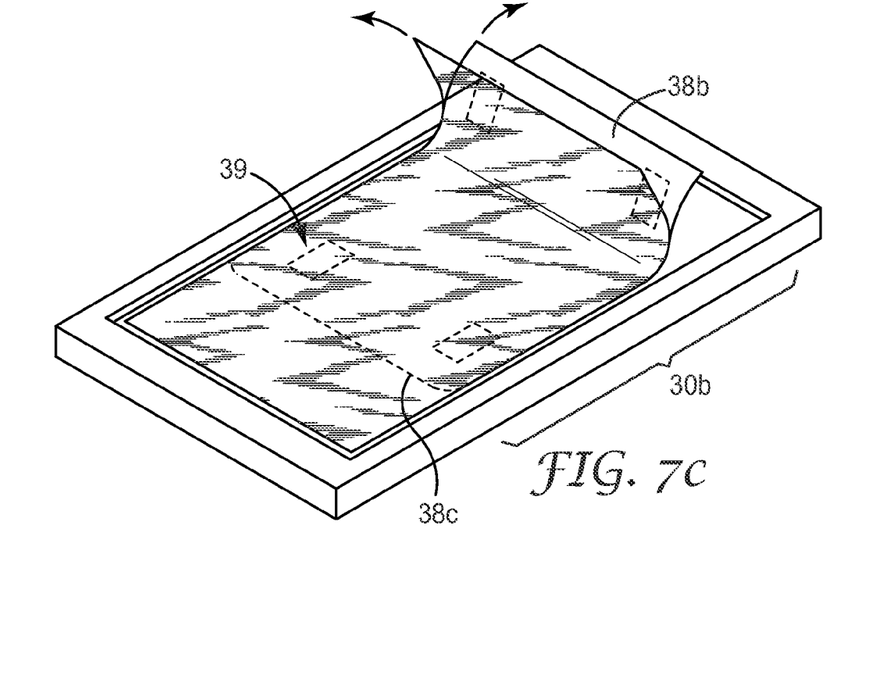
Figure 7D:
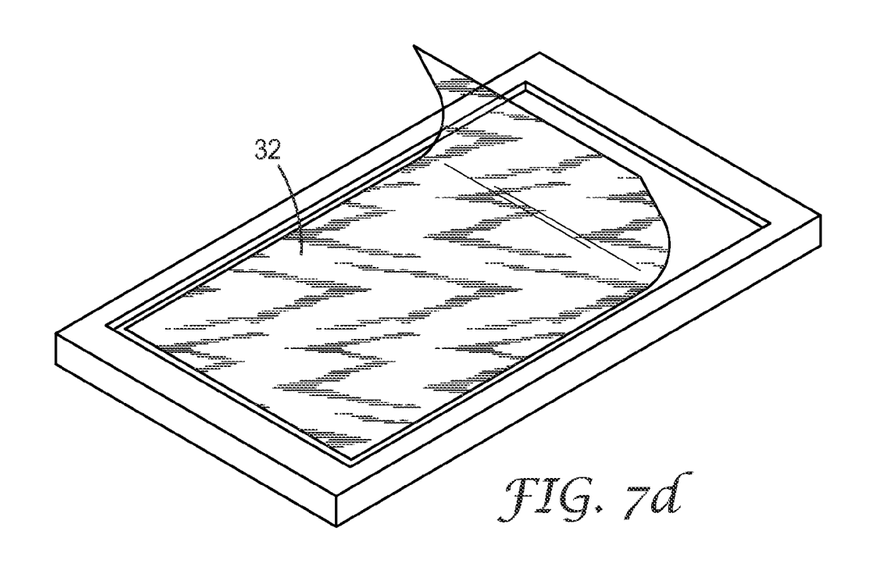

The next step is shown in FIG. 7c, wherein first portion 30b of laminate 30 is separated from the display panel (the PSA of regions 39 is a removable PSA as described below). First portion 30b is lifted up, and second portion 38b of release liner 38 is separated from the adhesive layer to expose a remaining portion of the adhesive layer, and the remaining portion of the adhesive layer is contacted with the display panel such that the optical film covers at least about 95% of the display panel. In some embodiments, it may be acceptable for the optical film to cover at least about 90%, 92%, 95%, 98% or at least about 100% of the display panel. In some embodiments, it may be acceptable for the optical film to cover at from about 90% to at least about 100%, from about 92% to at least about 100%, or from about 95% to about 98% of the display panel. As shown in FIG. 7d, after second portion 38b of release liner 38 is removed from the adhesive layer, the remaining portion of optical film 32 is adhered to the display panel.

As can be seen from the embodiments shown in FIGS. 3a-3c, 4a-4d and 7a-7d, the method can be carried out without liquid such as aqueous or nonaqueous solutions. The method can also be carried out with trimming or cutting the pre-cut laminate.

The adhesive layer is self-wetting, i.e., the adhesive layer spontaneously wets the display panel by pulling itself down using its own weight, with no added pressure, or with no more than finger pressure. The adhesive layer may be removable, i.e., the adhesive layer may have removable properties such that it can be bonded and removed from the panel repeatedly for repositioning or reworking. In some cases, as much as 90% of the optical film can be lifted up from the panel (an equivalent to about 1 cm$^2$), while maintaining the position of the film on the panel.

The adhesive layer may exhibit initial removability by having a 90° peel force of less than about 30 g/cm (75 g/in), and after one week at room temperature, a 90° peel force of less than about 157 g/cm (400 g/in), less than about 79 g/cm (200 g/in), or less than about 39 g/cm (100 g/in). (Peel force may be measured using a peel tester from IMASS.) The adhesive layer may have strong cohesive strength for structural integrity, limiting cold flow and giving elevated temperature resistance, in addition to permanent removability.

The adhesive layer may comprise the cured reaction product of a multifunctional ethylenically unsaturated siloxane polymer and one or more vinyl monomers as described in US 2007/0055019 A1 (Sherman et al.) and US 2007/0054133 A1 (Sherman et al.).

The adhesive layer may comprise a PSA such that the layer exhibits tack when applied with little or no added pressure. PSAs are described in the Dalquist criterion line (as described in Handbook of Pressure Sensitive Adhesive Technology, Second Ed., D. Satas, ed., Van Nostrand Reinhold, New York, 1989). Useful PSAs include those based on natural rubbers, synthetic rubbers, styrene block copolymers, (meth)acrylic block copolymers, polyvinyl ethers, polyolefins, and poly (meth)acrylates. As used herein, (meth)acrylic refers to both acrylic and methacrylic species and likewise for (meth)acrylate. A useful PSA is the adhesive used for POST-IT Notes available from 3M™ Co., particularly for the regions of PSA of the laminate shown in FIG. 6.

An exemplary PSA comprises a polymer derived from an oligomer and/or monomer comprising polyether segments, wherein from 35 to 85% by weight of the polymer comprises the segments. These adhesives are described in US 2007/0082969 A1 (Malik et al.).

Another exemplary PSA comprises the reaction product of a free radically polymerizable urethane-based or urea-based oligomer and a free radically polymerizable segmented siloxane-based copolymer. These adhesives are described in U.S. Provisional Application 61/410,510 (Tapio et al.). The free radically polymerizable urethane-based or urea-based oligomer can comprise ethylenically unsaturated groups and a non-silicone segmented urea-based unit, or a non-silicone unit with a urethane linking group. The free radically polymerizable segmented siloxane-based copolymer can comprise at least one polydimethyl siloxane segment and at least one oxyalkylene segment.

In some cases, the adhesive layer comprises an adhesive that does not contain silicone. Silicones comprise compounds having Si—O and/or Si—C bonds. An exemplary adhesive comprises a non-silicone urea-based adhesive prepared from curable non-silicone urea-based oligomers as described in WO 2009/085662 (Sherman et al.). A suitable non-silicone urea-based adhesive may comprise an X-B-X reactive oligomer and ethylenically unsaturated monomers. The X-B-X reactive oligomer comprises X as an ethylenically unsaturated group, and B as a non-silicone segmented urea-based unit having at least one urea group. In some embodiments, the adhesive layer is not microstructured.

Another exemplary adhesive comprises a non-silicone urethane-based adhesive as described in International Application No. PCT/US2010/031689 (Sherman et al.). A suitable urethane-based adhesive may comprise an X-A-B-A-X reactive oligomer and ethylenically unsaturated monomers. The X-A-B-A-X reactive oligomer comprises X as an ethylenically unsaturated group, B as a non-silicone unit with a number average molecular weight of 5,000 grams/mole or greater, and A as a urethane linking group.

The optical film, and thus the adhesive layer and the optical substrate, are optically clear, having high light transmittance of from about 80 to about 100%, from about 90 to about 100%, or from about 95 to about 100% over at least a portion of the visible light spectrum (about 400 to about 700 nm); and a haze value of less than about 5%, or less than about 1%. Haze values in transmission can be determined using a haze meter according to ASTM D1003. The optical film, and thus the adhesive layer and the optical substrate, may be translucent in that light is reflected and transmitted.

The method disclosed herein can be used to alter surface reflection properties of large format display panels, either during or after manufacture of the electronic device. That is, the adhesive layer is disposed on an inner surface of the optical substrate, and the optical substrate further comprising an outer surface opposite the inner surface; wherein the outer surface reflects light differently than the display panel. This generally means that for a given viewing angle, the amount of light reflected from the display panel with and without the optical film applied thereto, is different within that viewing angle, by at least about 5% to about 80%, from about 20% to about 70%, or from about 30% to about 60%. For example, the outer surface of the optical substrate may comprise a glossy finish, and the surface of the display panel may comprise a matte finish.

The optical substrate typically comprises a polymeric film having one or more polymeric layers. Exemplary polymeric films include polyester films, polyacrylate films, polycarbonate films, cellulose-based films, etc. The optical film may comprise a hardcoat layer comprising a polymeric layer of inorganic nanoparticles in a binder. The optical film may have any one or more of antistatic, antireflection, UV protective and smudge resistant properties.

The release liner may have a low adhesion surface for contact with the adhesive layer. Release liners may comprise paper such as Kraft paper, or polymeric films such as poly(vinyl chloride), polyester, polyolefin, cellulose acetate, ethylene vinyl acetate, polyurethane, and the like. The release liner may be coated with a layer of a release agent such as a silicone-containing material or a fluorocarbon-containing material. The release liner may comprise paper or a polymeric film coated with polyethylene which is coated with a silicone-containing material. Exemplary release liners include liners commercially available from CP Films Inc. under the trade designations "T-30" and "T-10" that have a silicone release coating on polyethylene terephthalate film.

This disclosure may be explained by way of various items or embodiments, representative examples of which are described below.

Item 1. A method of applying an optical film to a large format display panel, comprising:
(a) providing a large format display panel having a diagonal of at least about 432 mm (17 inches);
(b) providing a pre-cut laminate comprising
an optical film comprising an adhesive layer disposed on an optical substrate, and
a release liner disposed on the adhesive layer opposite the optical substrate;
(c) separating the release liner from the adhesive layer to expose a portion of the adhesive layer, the exposed portion comprising less than 25% of the total area of the adhesive layer;
(d) contacting the exposed portion of the adhesive layer with the display panel;
(e) further separating the release liner from the adhesive layer to expose a remaining portion of the adhesive layer; and
(f) contacting the remaining portion of the adhesive layer with the display panel such that the optical film covers at least 95% of the display panel;
wherein the method is carried out without liquid.

Item 2. A method of applying an optical film to a large format display panel, comprising:
(a) providing a large format display panel having a diagonal of at least about 432 mm (17 inches);
(b) providing a pre-cut laminate comprising
an optical film comprising an adhesive layer disposed on an optical substrate, and
a split release liner comprising first and second portions disposed on the adhesive layer opposite the optical substrate, the second portion comprising regions of pressure sensitive adhesive opposite the adhesive layer;
(c) adhering the pre-cut laminate to the display panel by contacting the panel with the regions of pressure sensitive adhesive;
(d) separating the first portion of the split release liner from the adhesive layer to expose a portion of the adhesive layer, the exposed portion comprising less than 25% of the total area of the adhesive layer;
(e) contacting the exposed portion of the adhesive layer with the display panel;
(f) separating the regions of pressure sensitive adhesive from the display panel;

(g) separating the second portion of the release liner from the adhesive layer to expose a remaining portion of the adhesive layer; and (h) contacting the remaining portion of the adhesive layer with the display panel such that the optical film covers at least 95% of the display panel;

wherein the method is carried out without liquid.

Item 3. The method of Item 1, wherein the release liner is a split release liner.

Item 4. The method of any preceding Item, wherein the method is carried out without trimming or cutting the pre-cut laminate.

Item 5. The method of any preceding Item, wherein a gap of less than about 3 mm exists between the edges of the optical film and the display panel after the optical film is applied to the display panel.

Item 6. The method of any preceding Item, wherein the adhesive layer comprises a cured mixture comprising at least one X-B-X reactive oligomer, wherein X comprises an ethylenically unsaturated group, and B comprises a non-silicone segmented urea-based unit.

Item 7. The method of any preceding Item, wherein the adhesive layer comprises a cured mixture comprising at least one X-A-B-A-X reactive oligomer, wherein X comprises an ethylenically unsaturated group, B comprises a non-silicone unit with a number average molecular weight of 5,000 grams/mole or greater, and A comprises a urethane linking group.

Item 8. The method of any preceding Item, wherein the adhesive layer does not comprise silicone.

Item 9. The method of any preceding Item, wherein:

the adhesive layer is disposed on an inner surface of the optical substrate, the optical substrate further comprising an outer surface opposite the inner surface; and the outer surface reflects light differently than the display panel.

Item 10. The method of any preceding Item, wherein the outer surface of the optical substrate comprises a glossy finish, and the surface of the display panel comprises a matte finish.

Item 11. The method of any preceding Item, wherein the optical film is antireflective.

Item 12. The method of any preceding Item, wherein the optical film comprises a hardcoat layer.

Item 13. The method of any preceding Item, wherein the optical film covers at least 98% of the display panel.

Item 14. The method of any preceding Item, wherein the optical film extends beyond the display panel.

Item 15. The method of any preceding Item, wherein the adhesive layer is self-wetting.

Item 16. The method of any preceding Item, wherein the adhesive layer is removably repositionable.

EXAMPLES

Example 1

The following method was used to apply an optical film comprising Glossy Low Reflection Removable Protection Film from 3M™ Co. (with easy apply PSA) to a large format LCD TV having a 1016 mm (40 inch) diagonal. Prior to beginning the method, the optical film was pre-cut to cover half of the display panel.

Release liner was removed from the adhesive layer, but only to 76-102 mm (3-4") from top of film.

Film was aligned along the top and one edge of the display panel.

Top portion of film was adhered to top of display panel.

Release liner was removed while the adhesive layer was allowed to self-wet most of the surface of the display panel.

Film was pulled from a corner to remove large groups of air bubbles and reapply that section of film substantially free of bubbles.

Large bubbles, >3 mm (⅛ inch), were pushed out by sliding a squeegee tool along the surface of the film.

Small bubbles, <3 mm (⅛ inch), disappeared after 48 hrs with the TV on.

Example 2

The following method was used to apply an optical film comprising Glossy Low Reflection Removable Protection Film from 3M™ Co. (with easy apply PSA) having dimensions 287×509 mm (11.3×20.0 inches), to a computer display of Acer Model Z5610AIO, having a 590 mm (23 inch) diagonal and dimensions 292×514 mm (11.5×20.2 inches). Prior to beginning the method, the optical film was pre-cut.

The display surface was wiped with a 3M™ SCOTCH-BRITE Microfiber Cloth to remove particulate.

Liner was peeled back about 60 mm (2.4 inch) from a long edge of the film.

Exposed PSA on the film was adhered to the top portion of the display surface, and aligned such that the entire top gap between the film edge and the display bezel was less than 5 mm, and the gap along the left edge between the film and the bezel was less than 5 mm where the PSA was adhered to the display surface.

The film was laid down as flat as possible, with the remaining liner still in place, to ensure that the entire film was within the bezel of the display.

The remaining liner was then slowly peeled down, and as new PSA was exposed it wet out and adhered to the surface of the display. The process continued until all liner was removed.

Bubbles larger than 3 mm in diameter, where gently pushed out using a flat edge squeegee along the top surface of the film. Bubbles less than 3 mm in diameter disappeared after 48 hours.

Example 3

The following method can be used to apply an optical film to a large format LCD TV. The laminate comprises the optical film and a split release liner (upper and lower portions) on the adhesive layer, and areas of removable PSA (similar to POST-IT adhesive from 3M™ Co.) present on the lower portion, protected by a second release liner. Prior to beginning the method, the optical film is pre-cut.

The second release liner is stripped to reveal the areas of removable PSA.

The laminate is placed and aligned on the lower part of a display panel by contacting the panel with the areas of removable PSA.

Once aligned, the upper part of the laminate is bent back from the display panel and the release liner is separated to expose a portion of the adhesive layer.

The exposed upper portion of the adhesive layer is contacted with the display panel, starting in the center, such that the two are aligned. The optical film remains aligned because the lower liner with areas of removable PSA remains adhered to the display panel.

Once the upper portion of the optical film is adhered to the top of the display panel, the lower portion of the split release liner is lifted from the display panel and removed to expose a remaining portion of the adhesive layer.

The adhesive layer is allowed to self-wet the surface of the display panel.

Film was pulled from a corner to remove large groups of air bubbles and reapply that section of film substantially free of bubbles.

Large bubbles, >3 mm (1/8 inch), were pushed out by sliding a squeegee tool along the surface of the film.

Small bubbles, <3 mm (1/8 inch), disappeared after 48 hrs with the TV on.

What is claimed is:

1. A method of applying an optical film to a large format display panel, comprising:
   (a) providing a large format display panel having a diagonal of at least about 17 inches;
   (b) providing a pre-cut laminate comprising
      an optical film comprising an adhesive layer disposed on an optical substrate, and
      a split release liner comprising first and second portions disposed on the adhesive layer opposite the optical substrate, the second portion comprising regions of pressure sensitive adhesive opposite the adhesive layer;
   (c) adhering the pre-cut laminate to the display panel by contacting the panel with the regions of pressure sensitive adhesive;
   (d) separating the first portion of the split release liner from the adhesive layer to expose a portion of the adhesive layer, the exposed portion comprising less than 25% of the total area of the adhesive layer;
   (e) contacting the exposed portion of the adhesive layer with the display panel;
   (f) separating the regions of pressure sensitive adhesive from the display panel;
   (g) separating the second portion of the release liner from the adhesive layer to expose a remaining portion of the adhesive layer; and
   (h) contacting the remaining portion of the adhesive layer with the display panel such that the optical film covers at least 95% of the display panel;
   wherein the method is carried out without liquid.

2. The method of claim 1, wherein the method is carried out without trimming or cutting the pre-cut laminate.

3. The method of claim 1, wherein a gap of less than about 3 mm exists between the edges of the optical film and the display panel after the optical film is applied to the display panel.

4. The method of claim 1, wherein the adhesive layer comprises a cured mixture comprising at least one X-B-X reactive oligomer, wherein X comprises an ethylenically unsaturated group, and B comprises a non-silicone segmented urea-based unit.

5. The method of claim 1, wherein the adhesive layer comprises a cured mixture comprising at least one X-A-B-A-X reactive oligomer, wherein X comprises an ethylenically unsaturated group, B comprises a non-silicone unit with a number average molecular weight of 5,000 grams/mole or greater, and A comprises a urethane linking group.

6. The method of claim 1, wherein the adhesive layer does not comprise silicone.

7. The method of claim 1,
   the adhesive layer disposed on an inner surface of the optical substrate, and the optical substrate further comprising an outer surface opposite the inner surface;
   wherein the outer surface reflects light differently than the display panel.

8. The method of claim 7, wherein the outer surface of the optical substrate comprises a glossy finish, and the surface of the display panel comprises a matte finish.

9. The method of claim 1, wherein the optical film is antireflective.

10. The method of claim 1, wherein the optical film comprises a hardcoat layer.

* * * * *